United States Patent Office 3,439,790
Patented Apr. 22, 1969

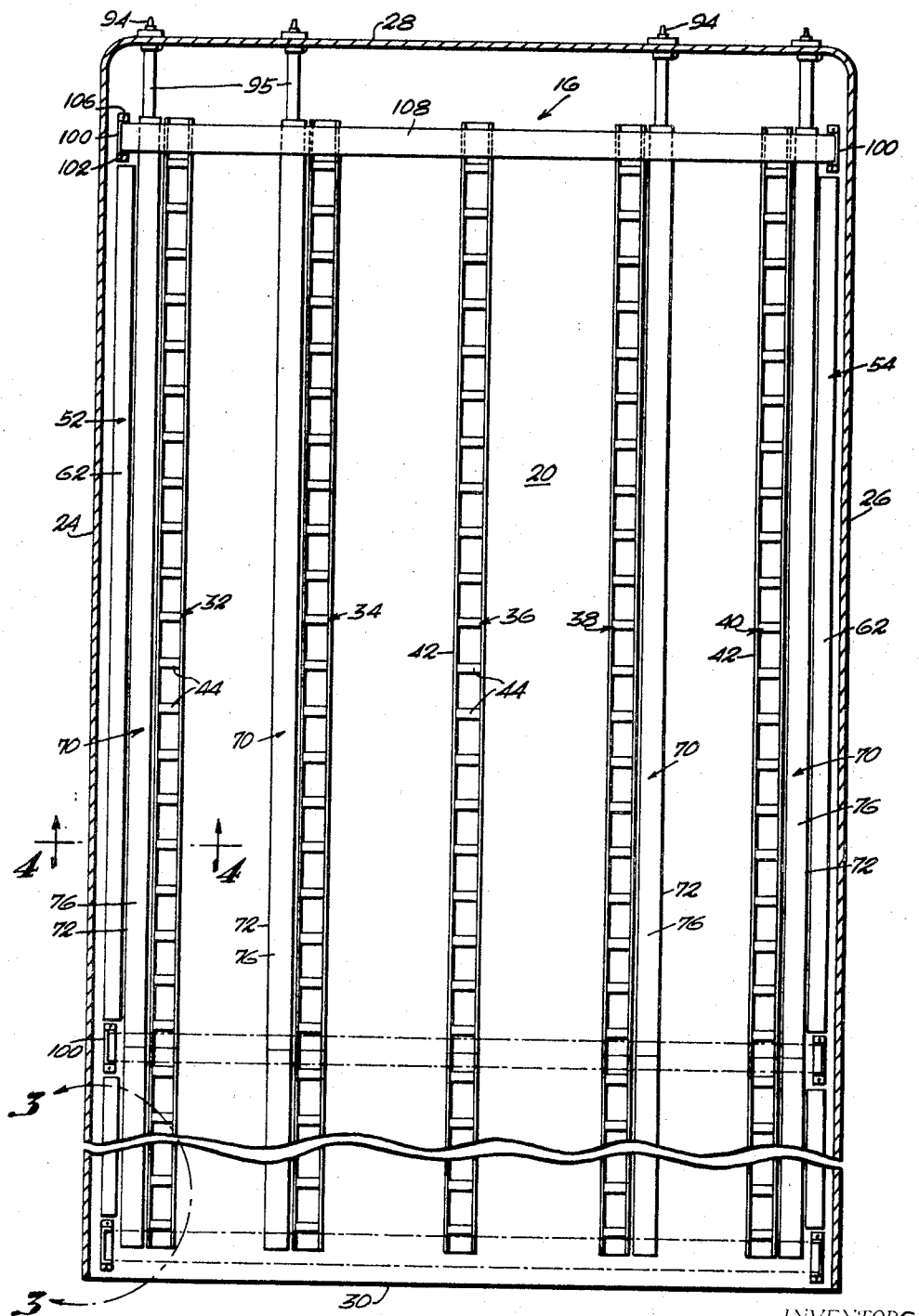

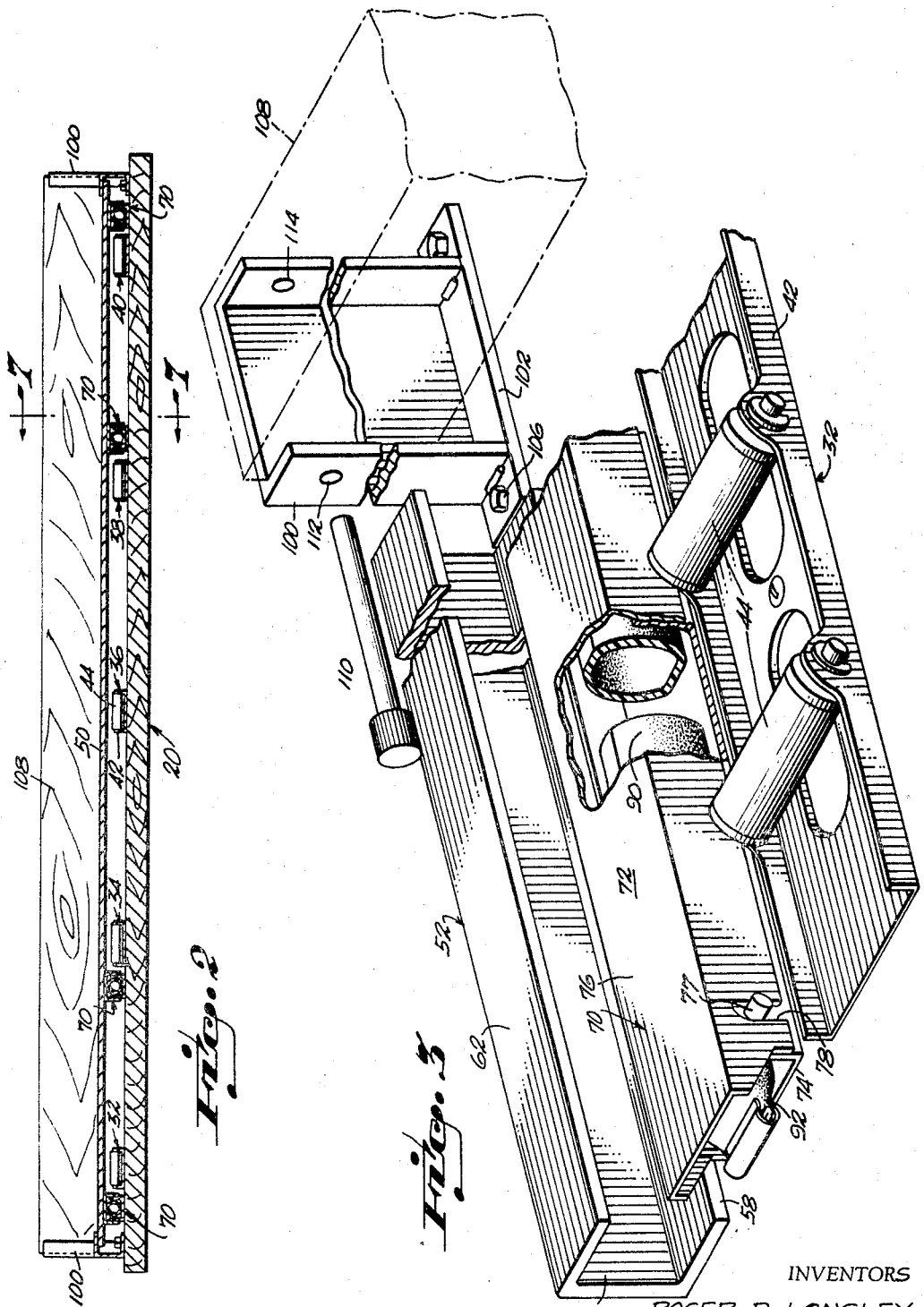

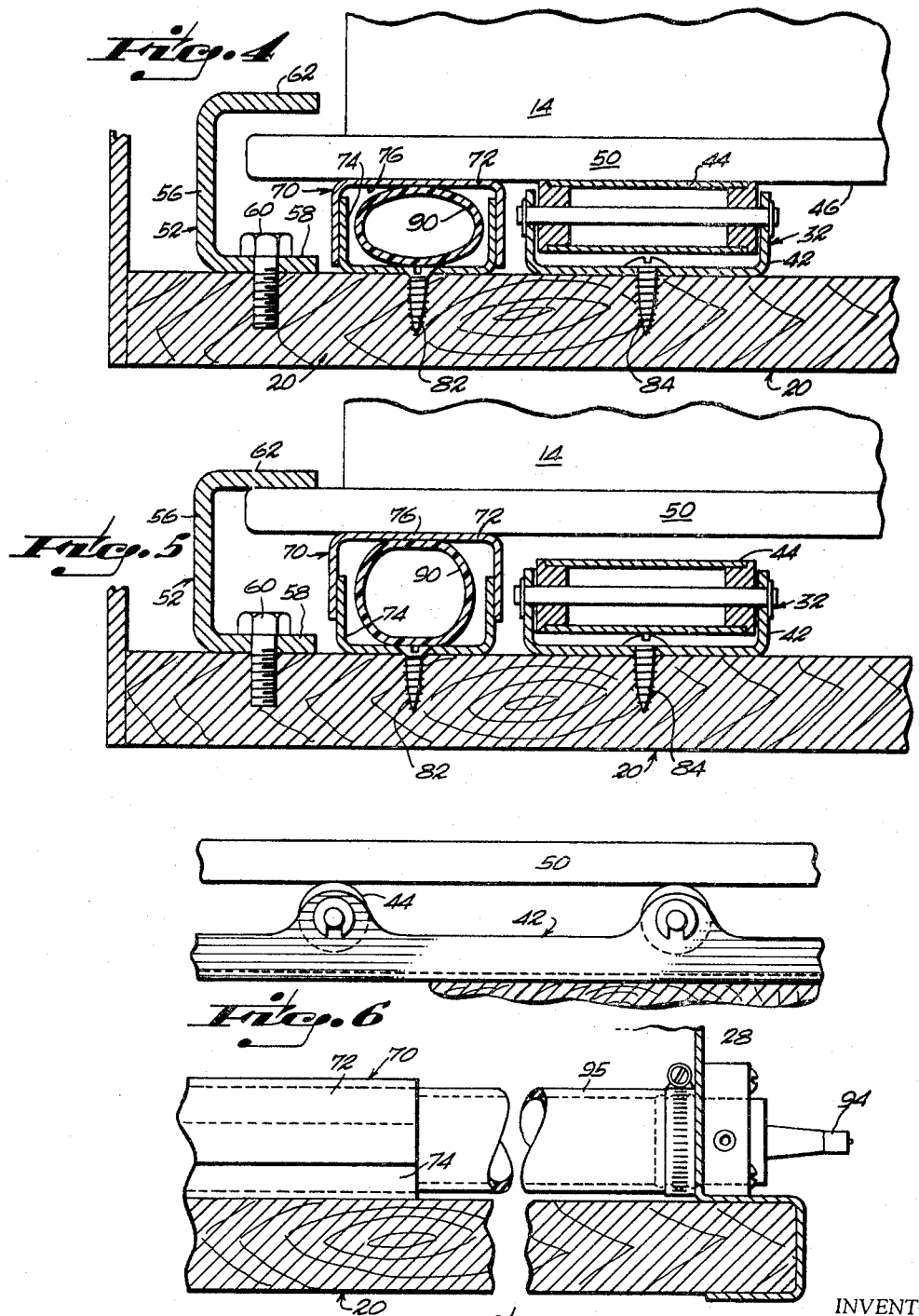

3,439,790
CARGO LOADING AND SUPPORT SYSTEM
Roger D. Langley, Miami, and Oscar T. Edlund, North Miami, Fla., assignors to Jet Avion Corporation, Hialeah, Fla.
Filed June 28, 1967, Ser. No. 649,499
Int. Cl. B65g 13/00
U.S. Cl. 193—35      4 Claims

ABSTRACT OF THE DISCLOSURE

In combination, a conveyor system for use in loading and unloading a palletizel load on a bed and a system for lifting and supporting the load in transit, said conveyor system comprising a plurality of parallel, longitudinally extending conveyor runs to be anchored to the bed to define a first plane for movement of pallets thereover at a first height, said system for lifting and supporting the load in transit comprising means to lift and support the load above said plane when in position in the van for transport and to be relaxed below said plane for unloading, said means to lift and support including an inflatable member.

---

This invention has as an object the provision of dual systems, a conveyor system for use in loading and unloading a palletized load over a bed and a lift and support system to lift the load above the conveyor system and support it in transit.

In the past, conveyor systems have been utilized for palletized loads; however, in transit, because of the jars and shifting of the load, the elements of the conveyor system are subjected to unequal force applications causing the same to become misaligned and damaged. The present invention has as an object the provision of dual systems for use in loading, transporting and unloading a palletized system which includes in side-by-side relation a conveyor system for use in the loading and unloading operation and a support system which is adapted to raise and lower the load with respect to the plane of movement defined by the conveyor system and to support the load in transit.

It is another object of this invention to provide an improved dual system for loading and unloading a vehicle of lading which includes a lift and support means for raising a palletized load above the conveyor system and supporting the same in the elevated position to cushion and absorb the impact of jars in transit.

It is another object of this invention to provide a dual system of the type described hereinbefore which is simple in construction, inexpensive to manufacture, and is adapted to carry a palletized load in discrete predetermined sections and to gently cushion the load in transit holding the same above the plane of movement defined by the conveyor system.

In accordance with these and other objects which will become apparent hereinafter, the instant invention will now be described with reference to the accompanying drawings in which:

FIGURE 1 is a partial plan view of the bed of a van provided with the instant invention;

FIGURE 2 is an end elevation view of FIGURE 1;

FIGURE 3 is an enlarged perspective view of that portion indicated in FIGURE 1 by the arrowed line 3—3;

FIGURE 4 is a partial view in cross section taken along the plane indicated by the line 4—4 of FIGURE 1 and looking in the direction of the arrows and illustrating the invention in a relaxed condition;

FIGURE 5 is a view similar to the view seen in FIGURE 4 with the invention in an expanded position;

FIGURE 6 is a schematic side elevation view of FIGURE 4 and illustrating the load being supported by the rollers of the conveyor; and FIGURE 7 is a side elevation view taken along the plane indicated by the line 7—7 of FIGURE 2 and looking in the direction of the arrows.

Referring to the drawings wherein like reference characters designate like or corresponding parts throughout the different views, and referring particularly to FIGURE 1, there is shown an in-transit support system for a van in combination with a conveyor system for use in loading and unloading a vehicle to accommodate moving a load 14 into position on the bed of the van. Referring to FIGURE 1, the bed 20 of a van, between side walls 24 and 26 and a forward wall 28 and a rearward edge 30, is provided with a plurality of spaced, longitudinally extending conveyors such as 32, 34, 36, 38 and 40, comprising the conveyor system. The conveyors, which can be seen in FIGURES 4, 5 and 6, comprise a cradle 42 to support the rollers 44 so as to define a plane 46 for movement of a load into and out of the van. A load 14 is supported on a pallet, such as 50, and may be moved forwardly or rearwardly, that is, longitudinally of the van, on the conveyor system as in loading and unloading. A longitudinally-extending guide rail, such as 52 and 54, is provided along each side of the van. Each guide rail is provided with an upstanding portion 56 supported by a foot 58 suitably fastened to the bed 20 as by the bolts 60 and a laterally-extending roof type portion 62 confronting the roof portion of the opposite guide rail. In effect, the roof portions of the guide rails provide a channel within which the pallets are confined in forward to rearward movement across the van bed. Means 70 are provided to raise the load 14 and pallet 50 when properly positioned in the van body and to support the load in transit above the conveyor system 16. This means will be readily understood on reference to FIGURES 3, 4 5 and 7 wherein it will be seen that spaced pairs of longitudinally-extending mating channel members 72 and 74 are provided with the terminal edges of the legs of the inner channel member 74 being movable toward abutting engagement with the interior surface of the web 76 of the upper channel member and, preferably, with the provision of a pin and slot means 77 and 78 to limit such movement to vertical movement only. The lower channel member 74 is securely fastened, as by the bolts 82, to the bed, which are similar to the bolts 84 which hold the conveyor system 16 in position. Means are provided to move the webs of the channel members of each pair apart, comprising an inflatable tubular member 90, such as a hose similar to a fire hose, arranged longitudinally in the chamber thereof, terminating in a closed end 92 at the rear of the trailer and in a feed valve 94 at the front of the van. It will be apparent that by increasing the pressure in the inflatable member, the pairs of channel members will expand from a relaxed height shown in FIGURE 4, which is equal to or slightly less than that of the conveyor system plane of movement above the bed of the truck, to a position with the web of the upper channel member being elevated with respect to the said plane of movement and preferably at a height such that the pallet is snugly gripped between the converging roof portions such as 62 of the guide rails on either side of the van body. A plurality of such means are provided to extend lengthwise of the bed of the truck and adjacent a respective conveyor run. A suitable feed, such as 95, may be provided to independently provide air, for instance, to an inflatable hose type member or through a common feed line to connect all of the hose members in parallel for uniform expansion and raising of the load. Lateral divider means may be provided comprising upstanding pocket-defining elements such as 100, the base 102 of which is securely fastened as by the bolts 106 to the floor or bed of the van and which receive a lateral bar such as that designated by the numeral 108 to span a trailer at a height somewhat greater than the support level of the load, the lateral bar being held in position by suitable means such as the pin 110 receivable through the holes 112 and 114 and a companionate hole in the lateral bar.

In use, as is apparent in FIGURES 4 and 5, the tubular member 90 when inflated will raise the pallet 50 from the position shown in FIGURE 4 to the position shown in FIGURE 5 so that the weight will then be carried, not on the rollers 44 of the conveyor, but, rather, on the longitudinally-extending surface of the upper member 72. Also, the roof portion 62 will limit the upward movement of the pallet 50 and tend to resist movement of it with respect to the roof portion by a frictional type of clamping movement. It will be apparent that the load will be resiliently supported by the inflating medium of the member 90 which may be charged through the valve shown in FIGURE 7.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination, (a) a conveyor system for use in loading and unloading a palletized load on a bed and (b) a system for lifting and supporting the load in transit, said conveyor system comprising a plurality of parallel, longitudinally-extending conveyor runs to be anchored to the bed to define a first plane for movement of pallets thereover at a first height in loading and unloading of the van;

said system for lifting and supporting the load in transit comprising means to lift and support the load above said plane when in position in the van for transport and to be relaxed below said plane for unloading, said means to lift and support the load comprising a plurality of pairs of interconnected, vertically extendible and longitudinally-extending members, a member of each of the pairs having an upper longitudinal surface parallel to said first plane, and the other of the members of each pair being adapted to be anchored to the bed, each of said pairs defining a longitudinally-extending pocket therebetween; and an inflatable member arranged longitudinally in each chamber and having a distended configuration and a relaxed configuration when the member is deflated such that the longitudinal surface is below said first plane, whereby on inflation of the tubular member, the pallets of a palletized load may be raised from a position of support by the conveyor runs following a loading operation to a position above said first plane for support of said load by said means to lift and support in transit.

2. The combination as set forth in claim 1 wherein said members of each of said pairs comprises mating confronting channel members defining said pocket between the webs and legs and guide means interconnecting the members to constrain the member having the upper longitudinal surface parallel to said first plane to vertical movement only with respect to the said other member which is adapted to be anchored to the bed.

3. The combination as set forth in claim 1 wherein longitudinally extending guide rails are provided adjacent said conveyor system and said system for lifting and supporting the load in transit, each of said guide rails being adapted to be anchored to the bed and a roof portion at a height greater than said first height and less than the maximum distended position of said longitudinal surface for limiting upward movement of a pallet on inflation of the tubular member and holding the pallets of the palletized load by friction in a predetermined position in the van.

4. The combination as set forth in claim 2 wherein the pairs of said means to lift and support the load are defined discrete areas and support means for lateral divider means are provided, said support means comprising spaced pockets to receive a divider block to prevent forward or rearward shifting of a palletized load.

References Cited

UNITED STATES PATENTS

| | | |
|---|---|---|
| 2,973,073 | 2/1961 | Elliott. |
| 3,011,665 | 12/1961 | Wise. |
| 3,130,829 | 4/1964 | Long. |
| 3,203,527 | 8/1965 | Daetwyler _____ 214—84 XR |

ALBERT J. MAKAY, *Primary Examiner.*

U.S. Cl. X.R.

214—84